United States Patent
Lee et al.

(10) Patent No.: US 9,601,961 B2
(45) Date of Patent: Mar. 21, 2017

(54) ARMATURE OF ROTATING ELECTRIC MACHINE WITH IMPROVED WEDGES

(71) Applicant: Hyundai Motor Company, Seoul (KR)

(72) Inventors: Jungwoo Lee, Gyeonggi-do (KR);
Young-Jin Seo, Gyeonggi-do (KR);
Hong Seok Yang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 267 days.

(21) Appl. No.: 14/569,741

(22) Filed: Dec. 14, 2014

(65) Prior Publication Data

US 2016/0072352 A1    Mar. 10, 2016

(30) Foreign Application Priority Data

Sep. 5, 2014   (KR) .......... 10-2014-0118334

(51) Int. Cl.
*H02K 3/48*   (2006.01)
*H02K 3/487*   (2006.01)
*H02K 3/52*   (2006.01)
*H02K 3/34*   (2006.01)

(52) U.S. Cl.
CPC ............ *H02K 3/487* (2013.01); *H02K 3/345* (2013.01); *H02K 3/522* (2013.01); *H02K 3/527* (2013.01)

(58) Field of Classification Search
CPC .......... H02K 3/34; H02K 3/345; H02K 3/487; H02K 15/12; H02K 3/48; H02K 55/04
USPC ................... 310/214–215, 264, 45
See application file for complete search history.

(56) References Cited

U.S. PATENT DOCUMENTS

| 4,118,646 | A |   | 10/1978 | Fleming et al. |
| 4,147,946 | A | * | 4/1979 | Linscott, Jr. .......... H02K 3/527 310/214 |
| 4,413,405 | A | * | 11/1983 | Doke ................ H02K 15/0018 29/596 |
| 4,710,663 | A | * | 12/1987 | Reid ...................... H02K 3/487 310/214 |
| 5,036,238 | A | * | 7/1991 | Tajima ................... H02K 3/527 174/DIG. 21 |
| 5,258,681 | A | * | 11/1993 | Hibino .................. H02K 3/493 310/214 |
| 5,886,446 | A |   | 3/1999 | Katagiri et al. |
| 6,054,790 | A |   | 4/2000 | Kjeer et al. |

(Continued)

FOREIGN PATENT DOCUMENTS

FR    854796 A    4/1940
GB    2022327 A    12/1979

(Continued)

*Primary Examiner* — Thanh Lam
(74) *Attorney, Agent, or Firm* — Mintz Levin Cohn Ferris Glovsky and Popeo, P.C.; Peter F. Corless

(57) ABSTRACT

The present disclosure provides an armature of a rotating electric machine. The armature of the rotating electric machine includes a wedge that is configured to close an opening of a slot around which coils are wound and support the coils disposed to a left side and a right side of the slot to prevent the coils from seceding from a core. The wedge includes a main plate that has a substantially V-shaped section. In addition, a support plate of the wedge is coupled with the main plate within the main plate and is configured to support the main plate in directions in which the main plate spreads to maintain a shape of the main plate.

6 Claims, 2 Drawing Sheets

(56) References Cited

U.S. PATENT DOCUMENTS

| | | | |
|---|---|---|---|
| 6,113,024 A * | 9/2000 | Pittard | ............ H02K 3/527 242/433 |
| 6,225,723 B1 | 5/2001 | Cooper et al. | |
| 2003/0184180 A1 | 10/2003 | Doherty et al. | |
| 2003/0193256 A1 | 10/2003 | Liebermann | |
| 2004/0263019 A1 | 12/2004 | Buchan et al. | |
| 2005/0231058 A1 | 10/2005 | Down et al. | |
| 2007/0120429 A1 | 5/2007 | Howard et al. | |

FOREIGN PATENT DOCUMENTS

| GB | 1046145 A | 10/1996 |
|---|---|---|
| JP | 2005-184994 A | 7/2005 |
| JP | 2008-017647 A | 1/2008 |
| JP | 2011-072128 A | 4/2011 |
| JP | 2013-208039 A | 10/2013 |
| KR | 20-2000-0002904 U | 2/2000 |
| KR | 10-2013-0125835 A | 11/2013 |
| WO | 2013/146053 A1 | 10/2013 |
| WO | 2014/076783 A1 | 5/2014 |

* cited by examiner

ARMATURE OF ROTATING ELECTRIC MACHINE WITH IMPROVED WEDGES

CROSS-REFERENCE TO RELATED APPLICATION

This application claims under 35 U.S.C. §119(a) priority to Korean Patent Application No. 10-2014-0118334 filed on Sep. 5, 2014, the entire contents of which are incorporated herein by reference.

BACKGROUND

Technical Field

The present disclosure relates to an armature of a rotating electric machine, and more particularly, to an armature of a rotating electric machine with improved wedges.

Background Art

Generally, an electric machine is an energy conversion machine that converts electrical energy into mechanical energy or mechanical energy into electrical energy, such as a rotating electric machine that includes a motor and a generator. Recently, various types of rotating electric machines have been developed to increase efficiency and power density. A vehicle also includes a plurality of motors and generators. For example, an electric vehicle, a hybrid electric vehicle, and a fuel cell vehicle, which are eco-friendly vehicles, include a driving motor as a power source for driving, and the other vehicles use various types of motors, such as actuators for various machines.

As is well-known in the art, a rotating electric machine has a stator and a rotor, wherein the stator includes a core and a permanent magnet attached on or embedded within the core, and the rotor includes a core and coils wound (e.g., wrapped) around slots of the core. However, the above-described configuration is only exemplary. In other words, coils may be wound around the stator, instead of the rotor, and the permanent magnet may also be attached on the rotor, instead of the stator. In addition, in a wound rotor synchronous motor (WRSM), both a rotor and a stator have coil windings. In a rotating electric machine, a stator or a rotor around which coils are wound is called an armature, and in the following description, a rotor core or a stator core around which coils are wound through slots will be referred to as an armature core.

Further, in an armature of a rotating electric machine, wedges are used to fix and support the positions of coils wound around slots and to prevent the coils from seceding from the armature. The wedges are disposed within the slots around which the coils are wound within an armature core or the openings of the slots, to fix and support the coils and to prevent the coils from seceding from the armature core. However, wedges of the related art may decrease assembly efficiency since wedges are inserted in the axial direction through openings and assembled after coils are wound around stator slots of a motor. In addition, wedges of the related art have a complex configuration and require a complex assembly process, which may result in an increased weight and manufacturing costs.

FIG. 1 is an exemplary cross-sectional view showing an example of an armature in which wedges with a simple structure are installed according to the related art. In FIG. 1, a wedge 15 is disposed within a slot 12 of a rotor core 10 in a WRSM of a hybrid electric vehicle. As shown in FIG. 1, the wedge 15 assembled within the slot 12 of the core 10 closes an opening 12a of the slot 12, and supports and fixes coils 14 disposed to a left side and a right side of the slot 12 to prevent the coils 14 from seceding (e.g., separate) from the core 10. The wedge 15 is fabricated of a plastic material, and after coils 14 are wound around the slot 12 of the rotor core 10, the wedge 15 is inserted into the slot 12 in the axis direction of the rotor core 10 and assembled.

However, since the wedge 15 is fabricated with a plastic material, the wedge 15 may lack stiffness and durability. In addition, since the wedge 15 is inserted into the slot 12 in the axial direction and assembled, the wedge 15 may be difficult to assemble. In other words, when the wedge 15 is inserted into the slot 12 in the axial direction of the core 10 and the wound coils 14 within the slot 12 swell (e.g., enlarge) or the wound coils 14 protrude into the slot 12, the wedge 15 may get caught on the coils 14 (e.g., the coils 14 interfere with the insertion of the wedge) to prevent the wedge 15 from being inserted into the slot 12, and great power may be required to insert the wedge 15 into the slot 12. Further, when the wedge 15 is inserted in the axial direction, the wedge 15 may need to be inserted carefully into the slot 12 to prevent the wedge 15 from being caught by the coils 14 within the narrow space of the slot 12.

The above information disclosed in this section is merely for enhancement of understanding of the background of the invention and therefore it may contain information that does not form the prior art that is already known in this country to a person of ordinary skill in the art.

SUMMARY

The present disclosure provides an armature of a rotating electric machine with improved wedges.

In one aspect, the present invention provides an armature of a rotating electric machine that may include: a wedge configured to close an opening of a slot around which coils are wound and support the coils dispose to a left side and a right side of the slot to prevent the coils from seceding from a core, wherein the wedge may include a main plate that has a substantially V-shaped cross-section and is configured to be inserted into the slot to couple both ends of the main plate with two neighboring teeth of the core; and a support plate coupled with the main plate within the main plate and configured to support the main plate in directions in which the main plate spreads to maintain a shape of the main plate.

The main plate may be fabricated of a metal plate that has elasticity and as an elastic body where both sides are able to spread outward when the elastic body is closed with a bent point of the substantially V shape as the substantial center. The surfaces of the main plate, or one surface of the main plate that contacts (e.g., is disposed adjacent to) the coils within the slot may be coated with an insulating material, or an insulating layer may be interposed between the surface of the main plate and the coils to insulate the surface of the main plate from the coils.

In addition, both ends of the main plate may be bent to form groove-shaped parts, and both side ends of the support plate may be inserted into the groove-shaped parts of the main plate and fixed. Further, the main plate may be coupled with the core via coupling ends bent outward. In particular, the coupling ends may be both ends of the main plate when the coupling ends are inserted into and coupled with grooves formed in two neighboring teeth ends of the core.

BRIEF DESCRIPTION OF THE DRAWINGS

The above and other features of the present invention will now be described in detail with reference to certain exemplary embodiments thereof illustrated the accompanying drawings which are given herein below by way of illustration only, and thus are not limitative of the present invention, and wherein.

Figure 1:
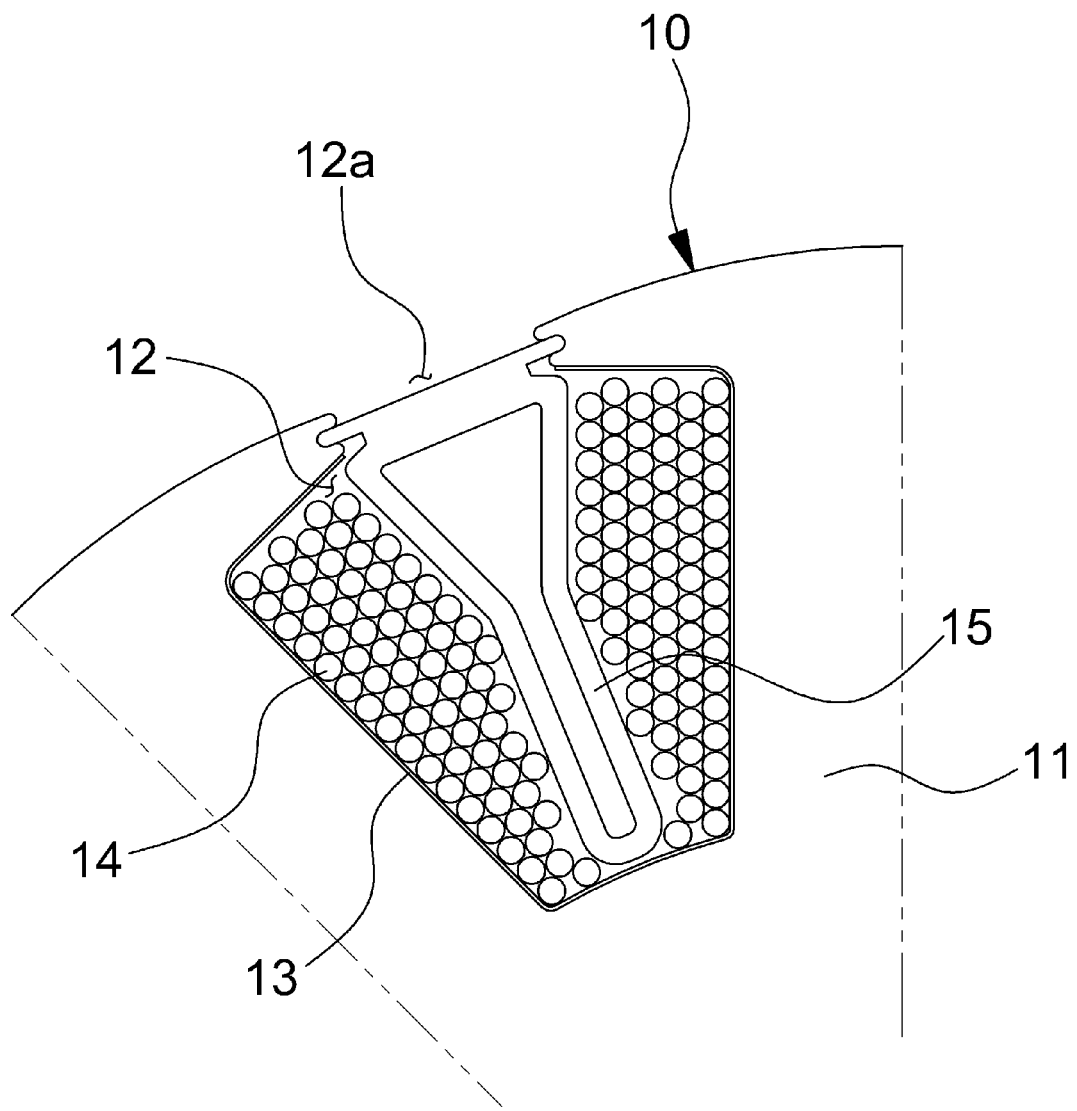
FIG. 1 is an exemplary cross-sectional view of an armature with wedges according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present disclosure provides an armature of a rotating electric machine with wedges that may increase assembly efficiency, have increased durability, such as stiffness, and enable wedges to be inserted into the openings of slots in the radial direction of an armature core by fabricating the wedges with a metal plate that has elasticity.

Figure 2:
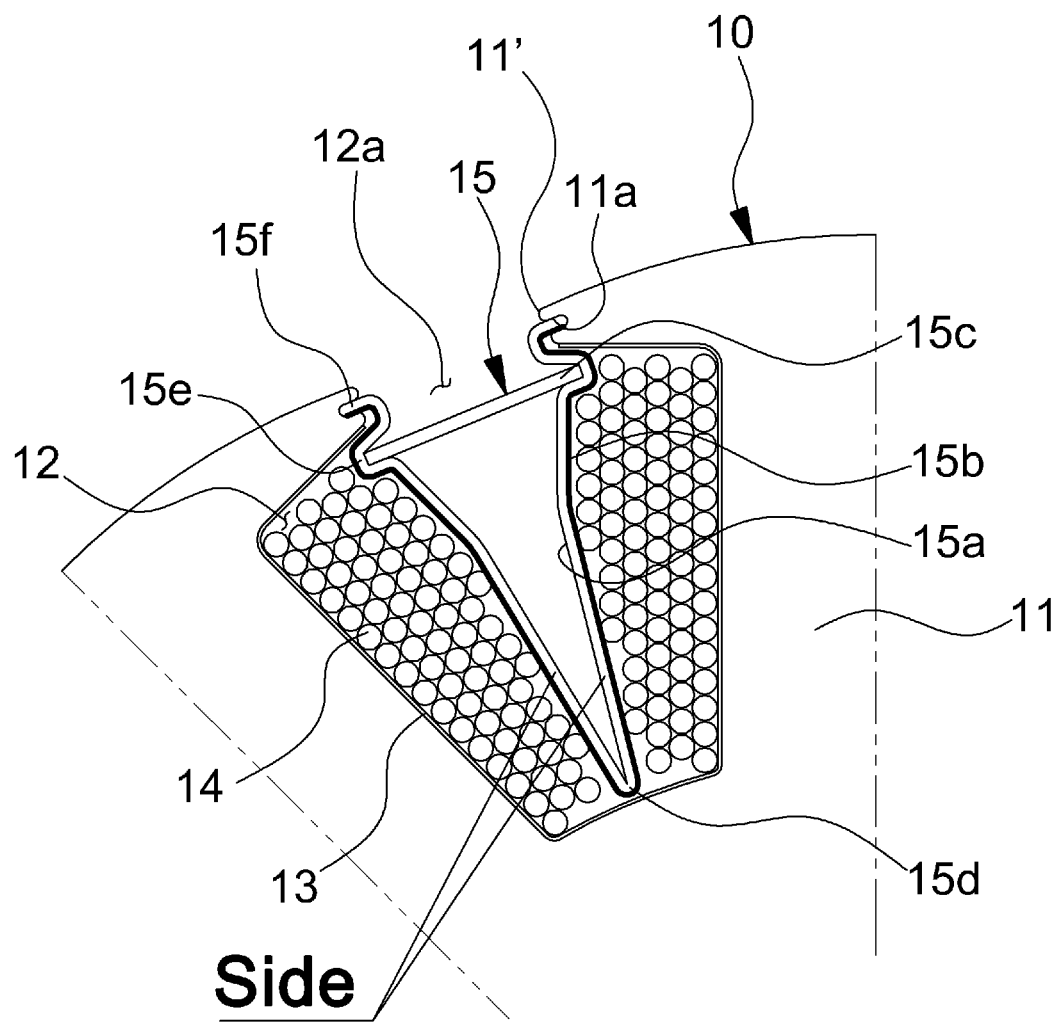
FIG. 2 is an exemplary cross-sectional view of an armature with a wedge installed in a slot according to an exemplary embodiment of the present disclosure.

FIG. 2 is an exemplary cross-sectional view of an armature with a wedge installed within a slot according to an exemplary embodiment of the present disclosure, wherein a wedge 15 may be installed into a slot 12 within an armature of a rotating electric machine. The rotating electric machine may be a motor (e.g., a wound rotor synchronous motor (WRSM)) or a generator. Further, the armature, around which coils 14 are wound, may be a rotor or a stator based on the type of the motor or generator.

As shown in FIG. 2, the coils 14 may be wound around the slot 12 of the core 10 within the armature of the rotating electric machine, and the wedge 15 may be assembled within the slot 12 of the armature core 10 and configured to support and fix the coils 14 disposed to a left side and a right side of the slot 12 and close the opening 12a of the slot 12 to prevent the coils 14 from seceding from the core 10.

In addition, the wedge 15 may have a substantially V-shaped cross-section as shown in FIG. 2. The wedge 15 may include a main plate 15a, which may be inserted into the slot 12 of the armature core 10 and both ends of the main plate may be coupled with two neighboring teeth end 11' of the core 10, and a support plate 15c, which may be coupled with the main plate 15a within the main plate 15a and configured to maintain a shape of the main plate 15a. The main plate 15a may be fabricated of a metal plate that has elasticity. For example, the main plate 15a may be fabricated of an elastic steel material.

The main plate 15a may have a substantially V-shaped cross-section, and be fabricated as an elastic body. Further, both sides of the elastic body may spread outward when the elastic body is closed with a bent point 15d of the substantial V shape as the substantial center. In addition, the surfaces of the main plate 15a, or one surface of the main plate 15a that contacts the coils 14 within the slot 12 may be coated with an insulating material. Alternatively, an insulating layer (e.g., insulating paper) may be interposed between the surface of the main plate 15a and the coils 14 to insulate the surface of the main plate 15a from the coils 14. In FIG. 2, 15b represents an insulating layer formed by insulation coating or an insulating paper.

Both ends of the main plate 15a may be bent to form groove-shaped parts 15e, into which side ends of the support plate 15c may be inserted and fixed. Additionally, the main plate 15a may include, at both ends, coupling ends 15f, which may be bent in directions that are opposite to the protruding directions of the groove-shaped parts 15e (e.g., outwards) to allow the coupling ends 15f to be inserted into and coupled with grooves 11a formed at the teeth ends 11' of the core 10.

The coupling ends 15f of the main plate 15a may remain coupled with the grooves 11a of the teeth ends 11' by the elasticity of the main plate 15a to spread outward. Further, the support plate 15c may be configured to support the main plate 15a when both side ends are inserted into and coupled with the groove-shaped parts 15e of the main plate 15a. In addition, the support plate 15c may be configured to fix the coupling ends 15f of the main plate 15a after being inserted into the grooves 11a of the core 10. The support plate 15c may be fabricated in a substantial shape of a plate of a metal material or a plastic material.

Further, the support plate 15c may be configured to close the opening 12a. A process of inserting the wedge 15 with the structure described above into the slot 12 of the armature core 10 will be described below.

After the coils 14 are wound around the slot 12 of the armature core 10, the main plate 15a may be closed with a bent point 15d as the substantial center, and the wedge 15 may be inserted into the slot 12 in the radial direction through the aperture 12a. Accordingly, the main plate 15a may be fixed by inserting the coupling ends 15f of the main plate 15a into the grooves 11a formed at the teeth ends 11' of the core 10.

In addition, the inner walls, which form the slot 12, of the core 10 may be insulated from the coils 14 by interposing an insulating paper 113 or an insulating film between the inner walls of the core 10 and the coils 14,. Alternatively, the main plate 15a may be inserted into the slot 12 in the axial direction, instead of the radial direction, and assembled. In particular, after the coupling ends 15f of the main plate 15a are coupled with the grooves 11a at the teeth 11' ends, the main plate 15a may slide in the axial direction. When the main plate 15a is fixed, the support plate 15c may be inserted into the slot 12 in the axial direction and assembled. In other words, when both side ends of the support plate 15c are coupled with the groove-shaped parts 15e of the main plate 15a, the support plate 15c may slide in the axial direction. When the main plate 15a and the support plate 15c are assembled in the slot 12 as described above, the main plate 15a may be configured to support and fix the coils 14 disposed to a left side and a right side of the slot 12 while closing the opening 12a of the slot 12 to prevent the coils 12 from seceding from the core 10.

In the armature that has the structure as described above, the wedges may have improved durability compared to conventional wedges made of a plastic material. In addition, since the main plate of each wedge may be inserted into a slot in the radial direction, instead of the axial direction, and assembled, interference by coils may be prevented during assembly, which leads to improvement of assembly efficiency compared to the conventional wedges.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. An armature of a rotating electric machine, comprising:
a wedge configured to close an opening of a slot around which coils are wound and support the coils disposed to a left side and a right side of the slot to prevent the coils from seceding from a core,
wherein the wedge includes:
a main plate that has a substantially V-shaped cross-section and is inserted into the slot to couple both ends of the main plate with two neighboring teeth of the core; and
a support plate coupled with the main plate within the main plate and configured to support the main plate in directions in which the main plate spreads to maintain a shape of the main plate.

2. The armature of claim 1, wherein the main plate is fabricated of a metal material that has elasticity and as an elastic body where both sides are able to spread outward when the elastic body is closed with a bent point of the substantially V shape as a substantial center.

3. The armature of claim 1, wherein the main plate or one surface of the main plate that contracts the coils within the slot is coated with an insulating material or an insulating layer is interposed between the surface of the main plate and the coils to insulate the surface of the main plate from the coils.

4. The armature of claim 1, wherein both ends of the main plate are bent to form groove-shaped parts, and both side ends of the support plate are inserted into the groove-shaped parts of the main plate and fixed.

5. The armature of claim 4, wherein the main plate is coupled with the core via coupling ends bent outward, the coupling ends are both ends of the main plate, when the coupling ends are inserted into and coupled with grooves formed in two neighboring teeth ends of the core.

6. The armature of claim 1, wherein an insulating paper or an insulating film is interposed between the coils and inner walls of the core to insulate the inner walls of the core from the coils.

* * * * *